(12) United States Patent
Koike et al.

(10) Patent No.: US 7,696,660 B2
(45) Date of Patent: Apr. 13, 2010

(54) STATOR FOR ROTARY ELECTRIC MACHINE

(75) Inventors: Akira Koike, Tokyo (JP); Ikuo Takeshita, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 391 days.

(21) Appl. No.: 11/850,233

(22) Filed: Sep. 5, 2007

(65) Prior Publication Data

US 2008/0054749 A1 Mar. 6, 2008

(30) Foreign Application Priority Data

Sep. 5, 2006 (JP) .............................. 2006-240583

(51) Int. Cl.
*H02K 11/00* (2006.01)
*H02K 5/22* (2006.01)

(52) U.S. Cl. ........................................ 310/71; 310/179
(58) Field of Classification Search ................. 310/71, 310/179, 180
See application file for complete search history.

(56) References Cited

U.S. PATENT DOCUMENTS

| 3,483,408 | A | * | 12/1969 | Schenker Hans-Joachim et al. ............................. 310/71 |
| 4,004,169 | A | * | 1/1977 | Charlton ...................... 310/71 |
| 4,215,464 | A | * | 8/1980 | Miller .......................... 29/596 |
| 4,231,070 | A | * | 10/1980 | Pitts, Jr. ....................... 358/481 |
| 4,689,023 | A | * | 8/1987 | Strong et al. ................. 439/189 |
| 4,851,725 | A | * | 7/1989 | Keck ........................... 310/71 |
| 5,243,246 | A | * | 9/1993 | Sakamoto .................... 310/179 |
| 5,861,689 | A | * | 1/1999 | Snider et al. .................. 310/71 |
| 6,020,660 | A | * | 2/2000 | Wright ...................... 310/68 R |
| 6,429,557 | B2 | * | 8/2002 | Sheeran et al. ................ 310/71 |
| 6,815,853 | B2 | * | 11/2004 | Koyama et al. ............... 310/71 |
| 7,105,961 | B2 | * | 9/2006 | Tetsuka et al. ................ 310/71 |
| 7,329,973 | B2 | * | 2/2008 | Oohashi et al. ............... 310/71 |
| 2007/0040461 | A1 | * | 2/2007 | Oohashi et al. ............... 310/71 |
| 2008/0054749 | A1 | * | 3/2008 | Koike et al. ................. 310/179 |

FOREIGN PATENT DOCUMENTS

| JP | 62064235 | * | 3/1987 |
| JP | 04-138048 | | 5/1992 |
| JP | 2001217570 | * | 8/2001 |
| JP | 2002-117923 | | 4/2002 |
| JP | 2005-190914 | | 7/2005 |

* cited by examiner

*Primary Examiner*—Karl I Tamai
(74) *Attorney, Agent, or Firm*—Rankin, Hill & Clark LLP

(57) ABSTRACT

A leading end portion of a lead wire holder located in a direction opposite to a direction in which six lead wires extend is inserted toward concave surfaces through an insertion opening. After the leading end portion has entered toward the concave surfaces and gotten out therefrom, the leading end portion is situated between opposed surfaces of hooks and a holder receiving portion bottom surface. With this arrangement, a back surface of a rear end portion located opposite to the leading end portion of the lead wire holder comes into contact with end surface portions of partitioning wall portions. An end surface portion of the rear end portion faces projecting portions. Then, the six lead wires are partially received in six lead wire receiving portions, respectively.

4 Claims, 9 Drawing Sheets

STATOR FOR ROTARY ELECTRIC MACHINE

BACKGROUND OF THE INVENTION

The present invention relates to a stator for a rotary electric machine.

Conventionally, such a stator for a rotary electric machine is known as including a stator core, windings, a slot insulator which is made of an insulating resin and is attached to the stator core, and a lead wire holding structure. In such a stator, the lead wire holding structure holds a plurality of lead wires for external connections. A plurality of lead-out wires of the windings are connected to the lead wires, respectively. The lead wire holding structure is fixed to the slot insulator. The lead holding structure is formed of a plate-like lead wire holder that holds the lead wires and a holder mounting portion on which the lead wire holder is held with respect to the slot insulator. A conventional holder mounting portion includes a holder receiving portion that receives the lead wire holder and a plurality of hooks that are formed in the vicinity of an opening of the holder receiving portion and project toward an inside of the opening. When the plate-like lead wire holder is received in the holder receiving portion through the opening, the hooks are bent by the lead wire holder, thereby enlarging the opening of the holder receiving portion. The plate-like lead wire holder is thereby received in the holder receiving portion through the opening. With this arrangement, after the plate-like lead wire holder has been received in the holder receiving portion, the lead wire holder is prevented from falling off from the holder mounting portion by the hooks.

In the conventional lead wire holding structure as described above, however, depending on a material of the slot insulator and a manner in which the lead wire holder is mounted on the holder mounting portion, the hooks are sometimes broken when the hooks are bent by the lead wire holder, thereby causing the lead wire holder to fall off from the holder mounting portion.

SUMMARY OF THE INVENTION

An object of the present invention is therefore to provide a stator for a rotary electric machine capable of reliably preventing a lead wire holder from falling off from a holder mounting portion.

A stator for a rotary electric machine, improvement of which is aimed at by the present invention comprises: a stator core including a plurality of magnetic pole portions; windings of one or more phases wound on the magnetic pole portions of the stator core; a slot insulator made of an insulating resin, attached to the stator core so as to provide electric insulation between the stator core and the windings of one or more phases; and a lead wire holding structure that holds N (N is an integer of two or more) lead wires for external connections. A plurality of lead-out wires of the windings of the one or more phases are respectively connected to the N lead wires, and the lead wire holding structure is fixed to the slot insulator. In the stator for a rotary electric machine of the present invention, the lead wire holding structure is formed of a plate-like lead wire holder and a holder mounting portion. The lead wire holder holds the N lead wires in such a manner that one end of each of core wires of the N lead wires is exposed and the core wires of the N lead wires are arranged at predetermined intervals. The lead wire holder has a front surface and a back surface. The lead wire holder is mounted on the holder mounting portion. The lead wire holder is thereby held with respect to the slot insulator. N through holes are formed in the lead wire holder at the predetermined intervals in a direction where the N lead wires are arranged. The N through holes open in both of the front and back surfaces of the lead wire holder. The core wires of the N lead wires are respectively inserted into the N through holes. The core wires of the N lead wires are inserted into the N through holes in the lead wire holder from the back surface of the lead wire holder so that the core wires protrude out of the front surface, and the N lead wires extend in the same direction along the back surface. The holder mounting portion includes: a supporting surface including a first supporting surface constituent portion and a second supporting surface constituent portion, which partially supports the back surface of the lead wire holder; opposed surfaces that partially face a peripheral edge portion of the front surface of the lead wire holder; N lead wire receiving portions; and N−1 partitioning wall portions. The N lead wire receiving portions respectively receive portions of the N lead wires arranged at intervals along the back surface of the lead wire holder. The N lead wire receiving portions are disposed lower than a hypothetical plane containing the supporting surface as a lower direction is defined in which the supporting surface is located lower than the opposed surfaces and an upper direction is defined in which the opposed surfaces are located higher than the supporting surface. Each of the N−1 partitioning wall portions is disposed between adjacent two of the lead wire receiving portions, and extends in the upper direction so that each of the N−1 partitioning wall portions partitions the adjacent two of the lead wire receiving portions. The N lead wire receiving portions each include a lead wire exit. The lead wire exits open toward one side of an orthogonal direction orthogonal to both of the lower direction and a direction where the N−1 partitioning wall portions are arranged, and allow the lead wires to extend outwardly from the lead wire receiving portions. Each of the N−1 partitioning wall portions includes a partitioning wall main portion and a projecting portion. The partitioning wall main portion has an end surface located in the upper direction of the partitioning wall main portion. A part of the end surface of the partitioning wall main portion partially constitutes the supporting surface. The projecting portion extends in the upper direction from an end of the partitioning wall portion main portion, the end being located side by side with the lead wire exit. A part of the end surface of each of the N−1 partitioning wall portions is located adjacent to the projecting portion, which constitutes the first supporting surface constituent portion. A concave surface is formed on the end surface portion of each of the N−1 partitioning wall portions so as to be continuous with the first supporting surface constituent portion and to take on a convex shape toward the lower direction. A remainder of the supporting surface, namely, the second supporting surface constituent portion is continuous with the concave surface and extends away from the lead wire exit in the orthogonal direction. An insertion opening is formed in the vicinity of the projecting portions. A leading end portion of the lead wire holder, located in a direction opposite to the direction where the N lead wires extend, is inserted toward the concave surfaces through the insertion opening. The lead wire holding structure is configured so that the leading end portion is inserted toward the concave surfaces through the insertion opening, and then gets out of the concave surface to situate the lead wire holder between the opposed surfaces and the supporting surface whereby the N lead wires are partially received in the N lead wire receiving portions, respectively.

In the stator for a rotary electric machine of the present invention, the leading end portion is inserted toward the concave surfaces through the insertion opening, and then gets out of the concave surface to situate the lead wire holder between the opposed surfaces and the supporting surface. Thus, the N lead wires are partially received in the N lead wire receiving portions, respectively. For this reason, unlike a conventional stator, when the lead holder is mounted on the holder mounting portion through the opening of a holder receiving portion, the hooks are not bent by the lead wire holder so as to enlarge the opening of the holder receiving portion. Accordingly, the hooks that prevent the lead wire holder from falling off will not be broken, and the lead wire holder may positively be prevented from falling off from the holder mounting portion.

A part of the opposed surfaces may be disposed to face the second supporting surface constituent portion, and remainders of the opposed surfaces are disposed on a side of the first supporting surface constituent portion rather than on a side of the second supporting surface constituent portion, not facing the first supporting surface constituent portion. Here, a shape of the concave surface, a shape of the projecting portion, positions of the part of the opposed surfaces that face the second supporting surface constituent portion, positions of the remainders of the opposed surfaces that do not face the first supporting surface constituent portion, and a shape of each of the lead wire receiving portions may be defined so that after the leading end portion of the lead wire holder has been inserted toward the concave surfaces through the insertion opening, the lead wire holder is situated between the part of the opposed surfaces that face the second supporting surface constituent portion and the second supporting surface constituent portion, a back surface of a rear end portion located on a side opposite to the leading end portion of the lead wire holder is brought into contact with the first supporting surface constituent portion, an end surface of the rear end portion faces the projecting portions, and then the portions of the N lead wires are partially received in the lead wire receiving portions, respectively. With this arrangement, the lead wire holder is arranged in a sandwiched relation between the portions of the opposed surfaces and the remainders of the opposed surfaces, and the first supporting surface constituent portion and the second supporting surface constituent portion. For this reason, the lead wire holder may securely be mounted on the holder mounting portion even when areas of the opposed surfaces are reduced.

The holder mounting portion includes a pair of opposed wall portions respectively disposed at either end thereof in a direction where the N lead wire receiving portions and the N−1 partitioning wall portions are alternately arranged. Namely, one of the opposed wall portions in the pair is disposed at one end of the holder mounting portion in a direction in which the N lead wire receiving portions and the N−1 partitioning wall portions are alternately arranged, and the other opposed wall portion in the pair is disposed at the other end of the holder mounting portion in that direction. The pair of opposed wall portions extends in the upper direction with respect to the opposed surfaces. The pair of opposed wall portions each include a pair of hooks. The pair of hooks project in a mutually facing direction and are integrally provided at each of the opposed wall portions. The pair of hooks are spaced from each other in the orthogonal direction. Surfaces of the pair of hooks, which face downward, in other words which face the supporting surface, constitute the opposed surfaces. A hook portion taper may be formed at a lower outside corner portion of one of the pair of hooks, the corner portion being located in the lower direction and located side by side with the lead wire exit, the one hook being located on a side of the lead wire exit in the orthogonal direction. A partitioning wall portion taper may be formed at an upper inside corner portion of the projecting portion of each of the N−1 partitioning wall portions, the corner portion being located in the upper direction and located on a side of the one hook in the orthogonal direction. In this case, the insertion opening may be formed by a gap defined by hook portion tapers and partitioning wall portion tapers. With this arrangement, when the leading end portion of the lead wire holder is inserted toward the concave surfaces through the insertion opening, the hook portion tapers and the partitioning wall portion tapers work to guide the leading end portion of the lead wire holder toward the concave surfaces. For this reason, the leading end portion of the lead wire holder may be smoothly inserted toward the concave surfaces.

Preferably, the lead wire holding structure may be covered with a cover member that is engaged with the holder mounting portion, which prevents the lead wire holder from falling off from the holder mounting portion. With this arrangement, even when some external force is applied to the lead wire holder, the cover member may prevent the lead wire holder from falling off from the holder mounting portion. The cover member may be formed separately from end brackets which rotatably support a rotary shaft of a rotor, and are respectively mounted at either end of the stator core. The cover member may also be formed as a portion of the end bracket.

The lead wire holder may be composed of a circuit substrate with a circuit pattern formed thereon. In this case, conductive wires extending from the windings are respectively soldered at predetermined positions of the circuit pattern on the front surface of the lead wire holder. With this arrangement, the conductive wires extending from the windings and the lead wires may readily and positively be connected.

In the present invention, unlike a conventional stator, when the lead holder is mounted on the holder mounting portion through the opening of the holder receiving portion, the hooks are not bent by the lead wire holder so as to enlarge the opening of the holder receiving portion. Accordingly, the hooks that prevent the lead wire holder from falling off will not be broken, and the lead wire holder may positively be prevented from falling off from the holder mounting portion.

BRIEF DESCRIPTION OF THE DRAWINGS

These and other objects and many of the attendant advantages of the present invention will be readily appreciated as the same becomes better understood by reference to the following detailed description when considered in connection with the accompanying drawings.

DETAILED DESCRIPTION OF PREFERRED EMBODIMENT

Figure 1:
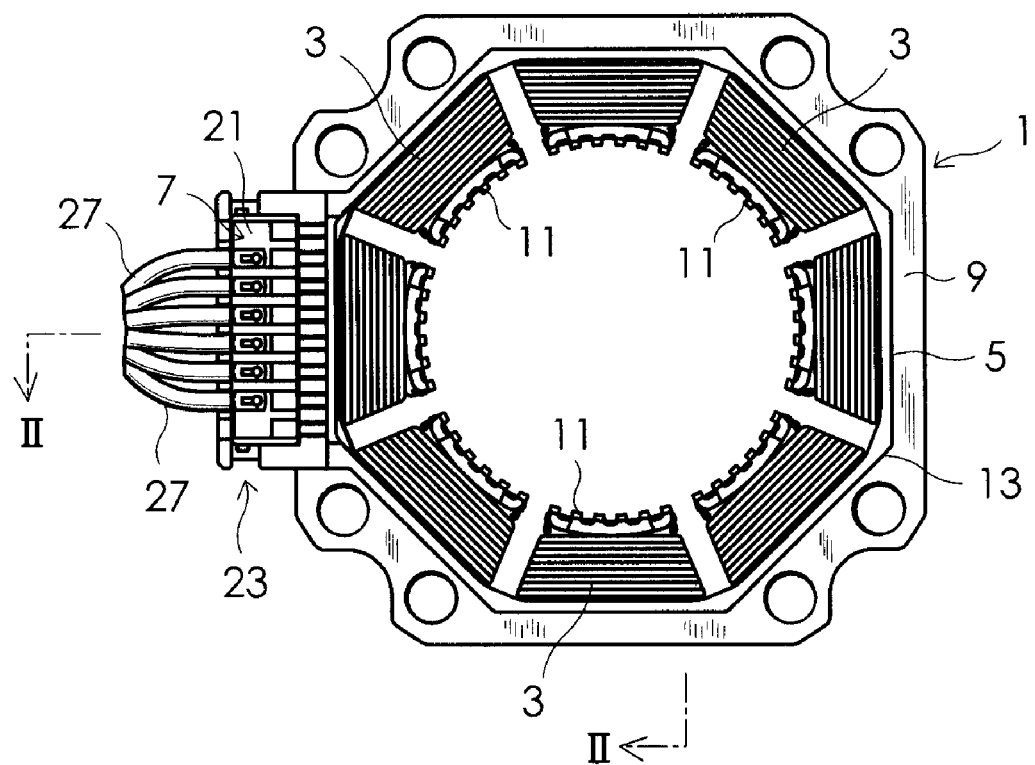
FIG. 1 is a plan view of a stator for a rotary electric machine in an embodiment of the present invention.
Figure 2:
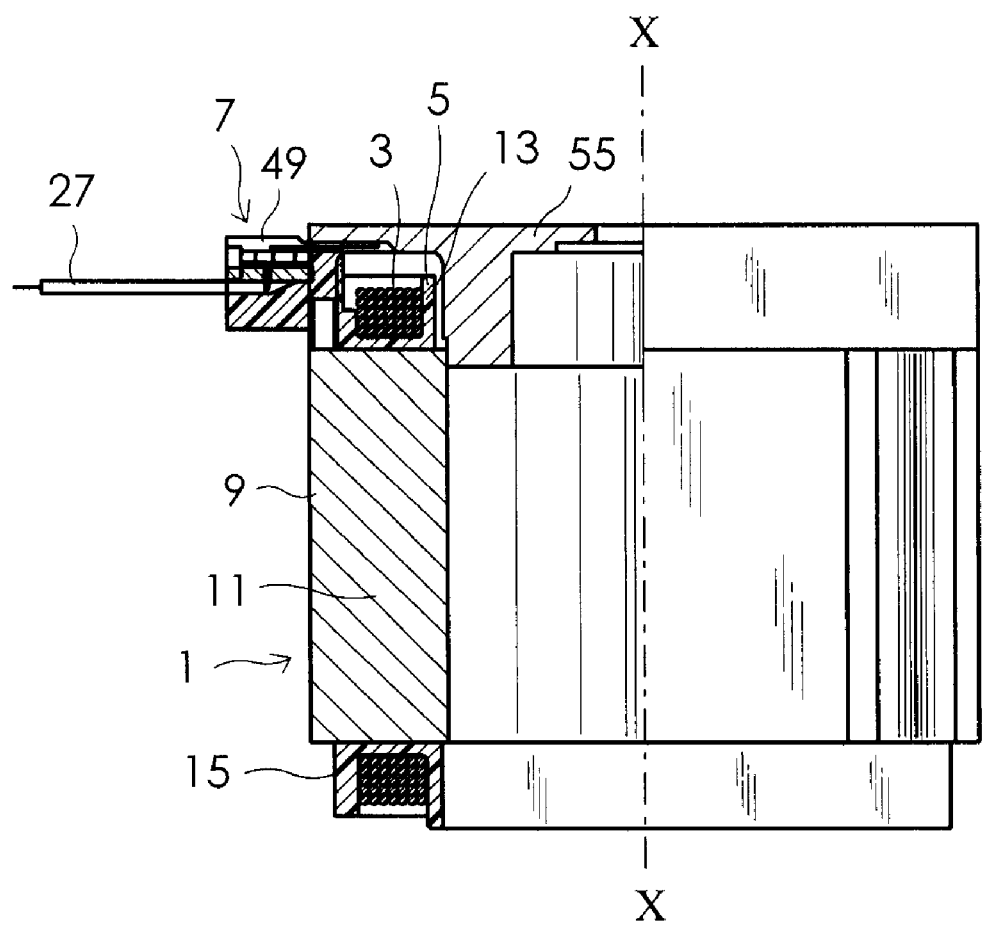
FIG. 2 is a partially broken front view of the stator for a rotary electric machine shown in FIG. 1.

An embodiment of the present invention will be described in detail with reference to drawings. FIG. 1 is a plan view of a stator for a rotary electric machine in the embodiment of the present invention, and FIG. 2 is a partially broken front view of the stator. FIG. 2 shows a section taken along line II-II of FIG. 1. In FIG. 1, a cover member 49 and end brackets 55 (shown in FIG. 2) which will be described later, are omitted from the illustration. As shown in both of FIGS. 1 and 2, the stator for a rotary electric machine in this embodiment includes a stator core 1, eight windings 3, a slot insulator 5, and a lead wire holding structure 7. The stator core 1 includes an annular yoke 9 and eight magnetic pole portions 11 which are disposed on an inner circumferential surface of the annular yoke 9 at intervals in a circumferential direction thereof. The stator core 1 is formed by laminating a plurality of magnetic steel plates of the same shape in an axial direction of a rotary shaft of a rotor not shown (or a longitudinal direction, X-X in FIG. 2). The eight windings 3 are respectively wound on the eight magnetic pole portions 11 of the stator core 1. The slot insulator 5 made of an insulating resin is attached to the stator core 1 in order to provide electrical insulation between the stator core 1 and the windings 3. The slot insulator 5 is formed of a pair of insulator divided members 13 and 15 that are fit into the stator core 1 from both sides in the axial direction (the longitudinal direction, X-X in FIG. 2).

Figure 3:
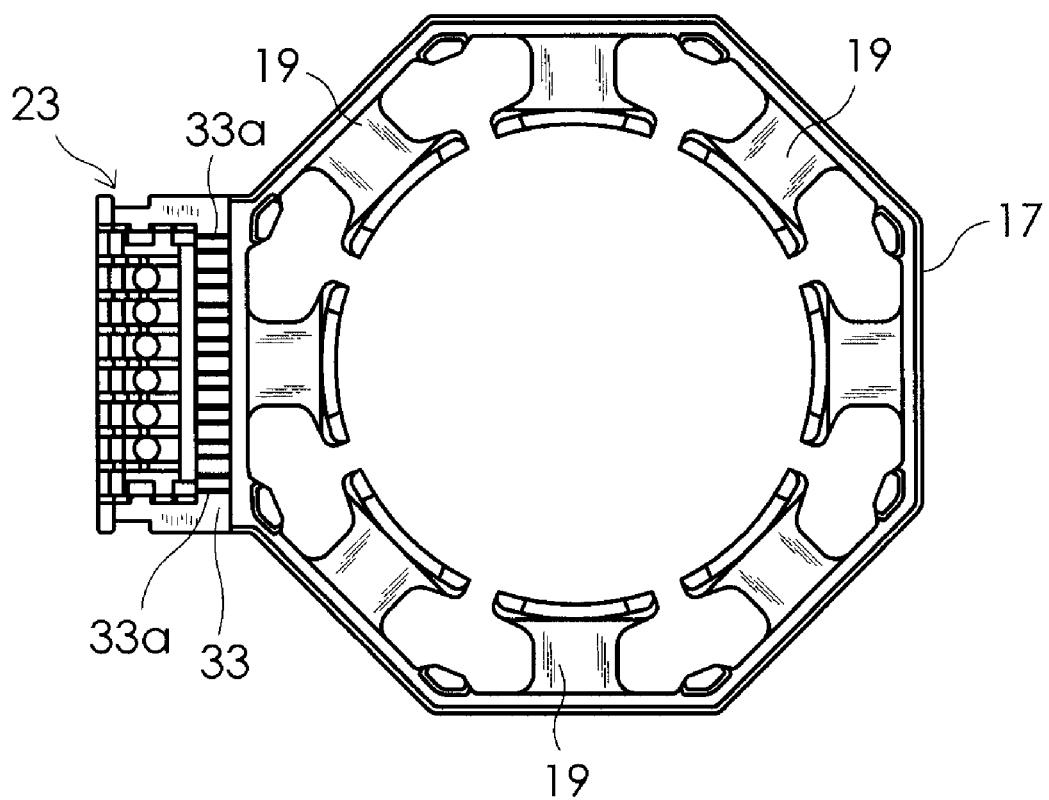
FIG. 3 is a plan view of an insulator divided member, which is one of a pair of the insulator divided members, and is located in an upper position in FIG. 2.

FIG. 3 is a plan view of the insulator divided member 13, which is one of the pair of the insulator divided members 13 and 15 and is located at an upper position in FIG. 2. The insulator divided member 13 is made of an insulating resin, and includes a base portion 17 that covers an inner circumferential surface of the yoke 9 and eight bobbin portions 19 that respectively cover surfaces of the magnetic pole sections 11 excluding magnetic pole surfaces of the magnetic pole portions 11. A holder mounting portion 23 is attached to the insulator divided member 13. The holder mounting portion 23 is integrally formed with the insulator divided member 13. The other of the pair of the insulator divided members 13 and 15, or the insulator divided member 15 has basically the same structure as the insulator divided member 13, which is the one of the pair of the insulator divided members 13 and 15, except that the holder mounting portion 23 is not attached to the insulator divided member 15.

Figure 4:
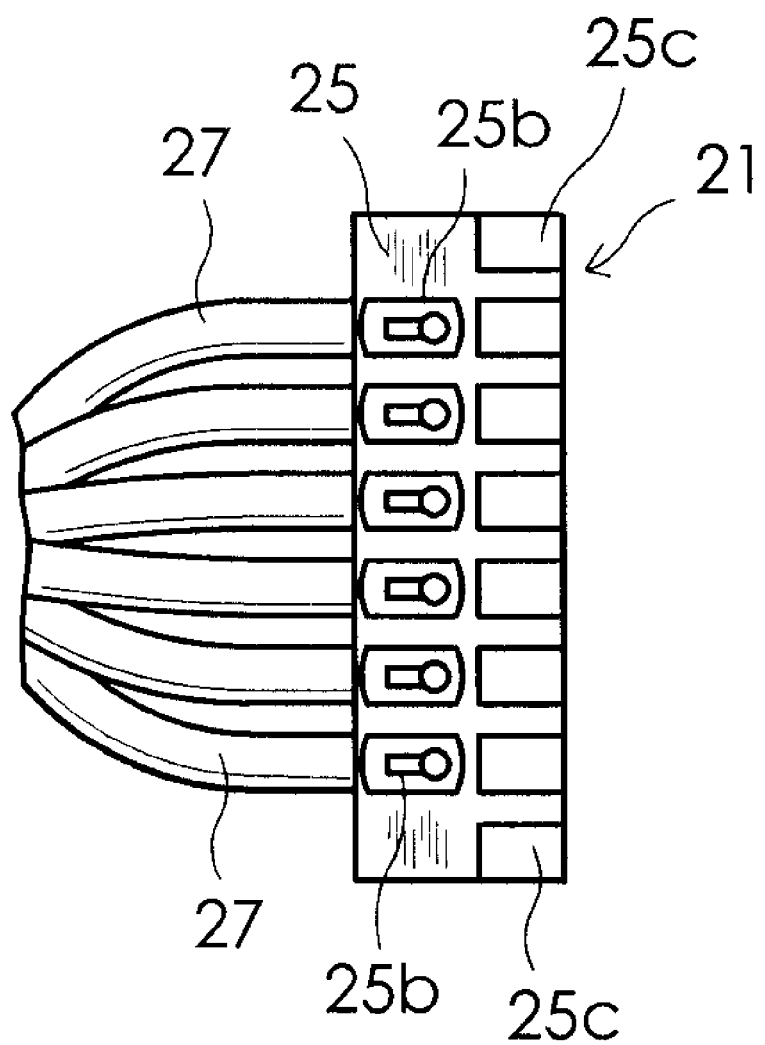
FIG. 4 is a plan view of a lead wire holder used for the stator for a rotary electric machine shown in FIG. 1.
Figure 5:
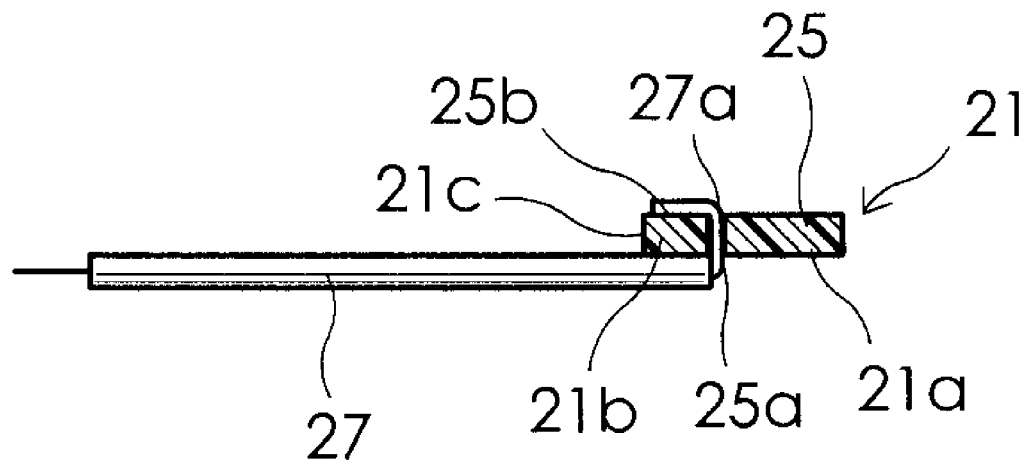
FIG. 5 is a front view of the lead wire holder used for the stator for a rotary electric machine shown in FIG. 1.

The lead wire holding structure 7 is formed of a lead wire holder 21 and the holder mounting portion 23 on which the lead wire holder 21 is mounted. As shown in FIGS. 4 and 5, the lead wire holder 21 includes a rectangular circuit substrate 25. In the circuit substrate 25, six through holes 25*a* are formed at predetermined intervals in a direction in which six lead wires 27 are arranged. The six through holes open in both of a front surface and a back surface of the circuit substrate 25. Core wires 27*a* of N (N is six in this embodiment) lead wires 27 are inserted into the six through holes 25*a*. The six lead wires 27 are inserted so that the core wires 27*a* are inserted into the six through holes 25*a* in the lead wire holder 21 from the back surface and protrude out of the front surface. The six lead wires 27 extend in the same direction along the back surface of the circuit substrate 25. The core wires 27*a* which have protruded out of the front surface are arranged side by side on the back surface so that the core wires 27*a* extend along the direction in which the six lead wires 27 extend on the back surface, or so that the core wires 27*a* extend in parallel with the six lead wires 27. Then, lead wire soldered portions 25*b* are formed on the front surface of circuit substrate 25. The core wires 27*a* are soldered to predetermined positions of the lead wire soldered portions 25*b* of the circuit substrate 25. Soldering is not shown. Eight conductive wire soldered portions 25*c* are formed in predetermined positions side by side with the lead wire soldered portions 25*b* on the circuit substrate 25. The conductive wires extending from the windings 3 are soldered to the conductive wire soldered portions 25*c*. The lead wire soldered portions 25*b* and the conductive wire soldered portions 25*c* are electrically connected to each other. A circuit pattern (not shown) including the lead wire soldered portions 25*b* and the conductive wire soldered portions 25*c* is formed on the circuit substrate 25.

Figure 6:
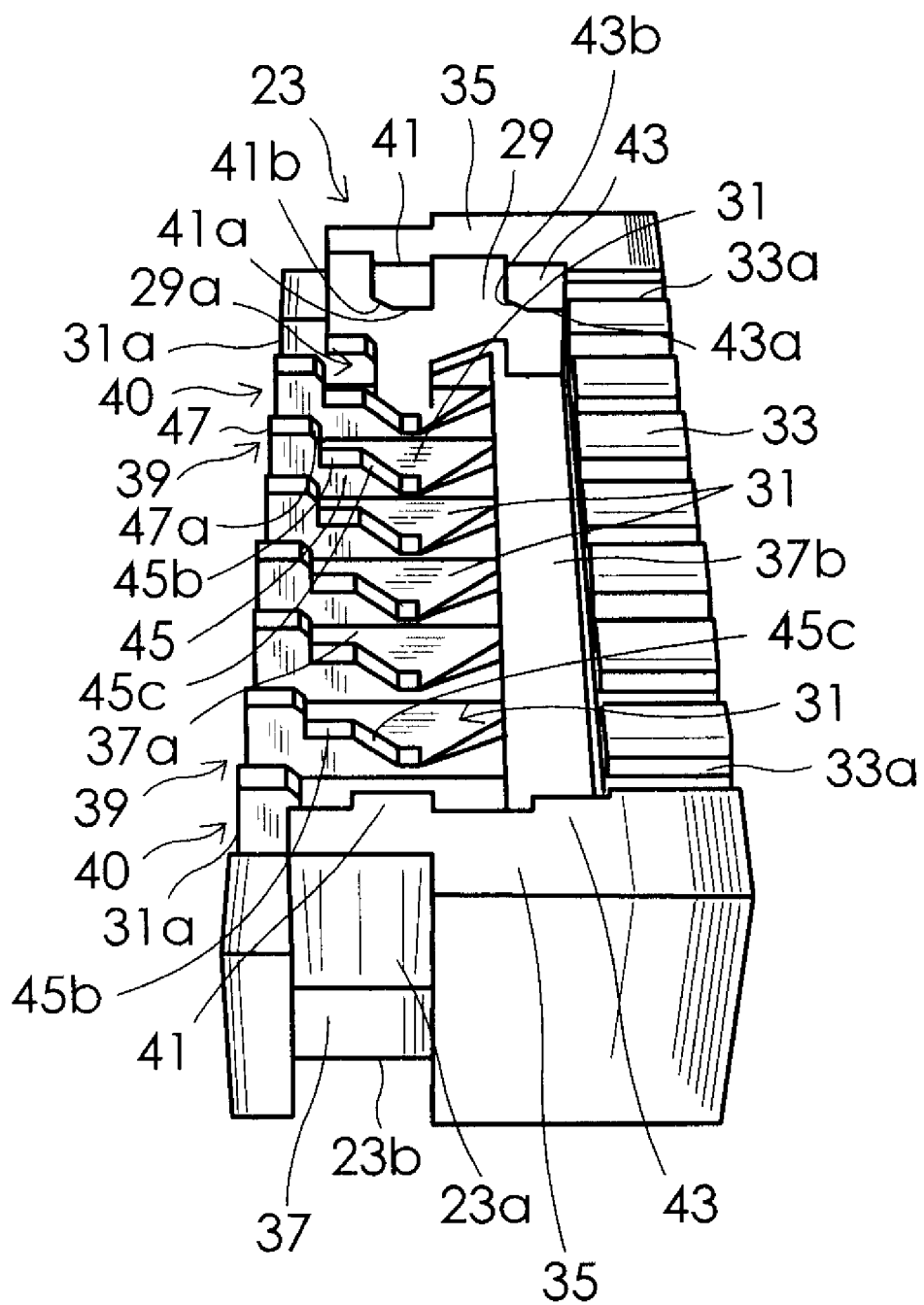
FIG. 6 is a perspective view of a holder mounting portion used for the stator for a rotary electric machine shown in FIG. 1.

The holder mounting portion 23 which has been integrally formed with the insulator divided member 13 is formed to project outwardly from a part of the base portion 17 so that the holder mounting portion 23 is located on one of the end surfaces of the yoke 9 of the stator core 1. As shown in FIG. 6, the holder mounting portion 23 has substantially a rectangular parallelepiped contour shape, and includes therein a holder receiving portion 29 that receives the lead wire holder 21 and N lead wire receiving portions 31 (N is six) that communicate with the holder receiving portion 29 and partially receives the six lead wires 27, respectively. The holder receiving portion 29 opens upwardly (as shown in FIG. 6). The six lead wire receiving portions 31 are disposed lower than a supporting surface 45*c*, 37*b* that supports the lead wire holder 21 received in the holder receiving portion 29.

The holder mounting portion 23 includes an insulator sidewall portion 33, a pair of opposed wall portions 35, and a bottom wall portion 37. The sidewall portion 33, the pair of opposed wall portions 35, and the bottom wall portion 37 surround the holder receiving portion 29 and the lead wire receiving portion 31. Further, the holder mounting portion 23 includes N-1 (N-1 is five) partitioning wall portions 39 each disposed between adjacent two of the lead wire receiving portions 31, and two sidewall portions 40 respectively disposed at either end of a row of the partitioning wall portions 39 in a direction in which the six lead wire receiving portions 31 are arranged.

The insulator sidewall portion 33 is coupled to the insulator divided member 13. Above this insulator sidewall portion 33, eight grooves 33*a* that extends over the insulator divided member 13 and the holder receiving portion 29 are formed side by side. The conductive wires extending from the windings 3 are respectively arranged in these grooves 33*a*.

A pair of a hook 41 and a hook 43 are integrally provided at each of the pair of opposed wall portions 35. The hook 41 and the hook 43 project in a mutually facing direction. The pair of the hook 41 and the hook 43 are spaced from each other in an orthogonal direction orthogonal to a direction where the five partitioning wall portions 39 are arranged. A surface 41*a* of the hook 41 and a surface 43*a* of the hook 43 constitute the opposed surfaces that partially face a peripheral edge portion of the surface of the lead wire holder 21. Thus, the lead wire holder 21 is arranged lower than the pair of the hook 41 and the hook 43. Hook portion tapers 41*b*, 43*b* are respectively formed at respective corner portions of the hooks 41 and 43 located in the lower direction of the hooks 41 and 43 and located on a side of a lead wire exit 31*a*, which will be described later. The tapers 41*b* and 43*b* (FIG. 6) are inclined with respect to the surfaces 41*a* and 43*a*.

The bottom wall portion 37 includes lead wire receiving portion bottom surfaces 37*a* that are bottom surfaces of the six lead wire receiving portions 31 and a holder receiving bottom surface 37b that constitutes a portion of the supporting surface, namely the second supporting surface constituent portion of the holder receiving portion 29. The lead wire receiving portion bottom surfaces 37a are located lower than the holder receiving bottom surface or the second supporting surface constituent portion 37b.

Each of the five partitioning wall portions 39 and each of the two sidewall portions 40 have the same shape, and each extend in the upper direction in order to partition adjacent two of the lead wire receiving portions 31. Each of the five partitioning wall portions 39 and the two sidewall portions 40 include a partitioning wall main portion 45 and a projecting portion 47, as shown in one of the partitioning wall portions 39 in FIG. 6. In the arrangement in which there are five partitioning wall portions 39 and two sidewall portions 40, the lead wire receiving portions 31 each include the lead wire exit 31a that opens toward one side of the orthogonal direction orthogonal to both the direction where the five partitioning wall portions 39 are arranged and the upper direction. Each lead wire exit 31a allows each lead wire to extend outwardly from the lead wire receiving portions 31. In the partitioning wall main portion 45, an end surface portion 45b that is adjacent to the projecting portion 47 and is located in an upper position of the partitioning wall main portion 45. The surface portions 45b partially constitute a supporting surface, namely constitute the first supporting surface constituent portions that partially support the back surface of the lead wire holder 21. In other end surface portion of the partitioning wall main portion 45, a concave surface 45c is formed so as to be continuous with the first supporting surface constituent portion 45b and to take on a convex shape toward the lower direction.

The projecting portion 47 of each of the five partitioning wall portions 39 and the two sidewall portions 40 extends in the upper direction from an end of the partitioning wall main portion 45 located side by side with the lead wire exit 31a. A partitioning wall portion taper 47a is formed at an upper inside corner portion of the projecting portion 47. An insertion opening 29a, into which the lead wire holder 21 is inserted, is defined by a gap between the partitioning wall portion tapers 47a and the hook portion tapers 41b of the two hooks 41.

The holder receiving portion bottom surface 37b of the bottom wall portion 37 described before is formed continuously with the concave surface 45c of the partitioning wall portion main portion 45 and extends parallel to the surface 43a of the hook 43. This holder receiving portion bottom surface 37b constitutes a remainder of the supporting surface or the second supporting surface constituent portion that partially supports the back surface of the lead wire holder 21.

Among the opposed surface 43a of the hook 43 and the opposed surface 41a of the hook 41, the opposed surface 43a faces the second supporting surface constituent portion or the holder receiving portion bottom surface 37b. The opposed surface 41a of the hook 41 is provided so as not to face the first supporting surface constituent portion or the end surface portion 45b.

Figure 7:
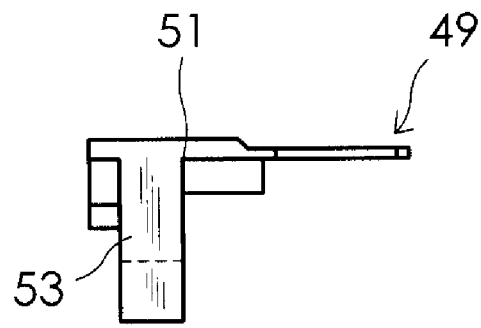
FIG. 7 is a front view of a cover member used for the stator for a rotary electric machine shown in FIG. 1.
Figure 8:
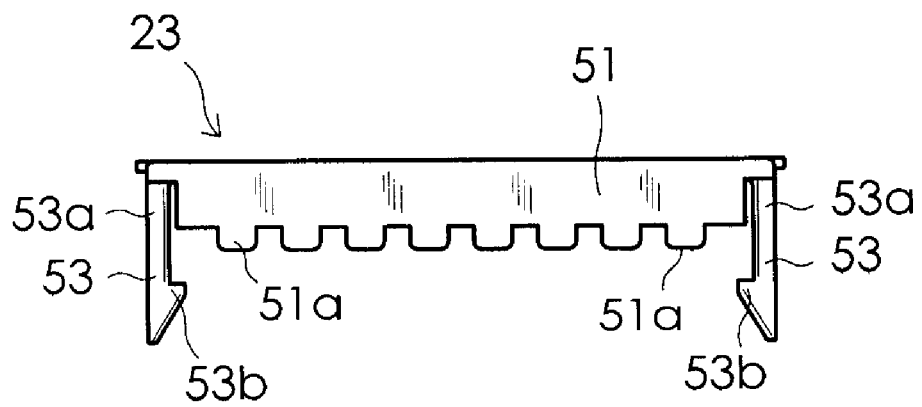
FIG. 8 is a left side view of the cover member used for the stator for a rotary electric machine shown in FIG. 1.

FIGS. 7 and 8 are a front view of the cover member 49 that covers the lead wire holding structure 7 and a left side view of the cover member 49, respectively. The cover member 49 is made of an insulating resin and includes a main portion 51 and a pair of hooks 53 that are respectively disposed on either side of the main portion 51. Namely, one of the hooks 53 in the pair is disposed on one side of the main portion 51 and the other hook 53 in the pair is disposed on the other side of the main portion 51. The main portion 51 has a rectangular plate-like shape and is arranged above the lead wire holder 21 mounted on the holder mounting portion 23. The main portion 51 includes eight projecting portions 51a that project downwardly. The two projecting portions 51a respectively located on either side of the eight projecting portions 51a are fit into gaps between the projecting portions 47 of the two sidewall portions 40 and the opposed wall portions 35, respectively. Six of the eight projecting portions 51a disposed inner than the two projecting portions 51a are located in the vicinity of between the respective projecting portions 47 of the five partitioning wall portions 39 and the two sidewall portions 40 for the lead wire holder 21.

The pair of the hooks 53 each include an extended portion 53a that extends in a direction orthogonal to the main portion 51 and an engaging portion 53b located at a leading edge of the extended portion 53a. The engaging portions 53b project so that the engaging portions 53b face each other. The extended portion 53a is arranged within a groove portion 23a (in FIG. 6) that extends over the pair of the opposed wall portions 35 and the bottom wall portion 37. Then, each engaging portion 53b is engaged with a corner portion 23b located at a lower position of the bottom wall portion 37. The cover member 49 prevents the lead wire holder 21 from falling off from the holder mounting portion 23.

As shown in FIG. 2, the cover member 49 is partially covered with an end bracket 55. End brackets 55 are mounted at both ends of the stator core 1, thereby rotatably supporting the rotary shaft of the rotor not shown.

Figure 9A:
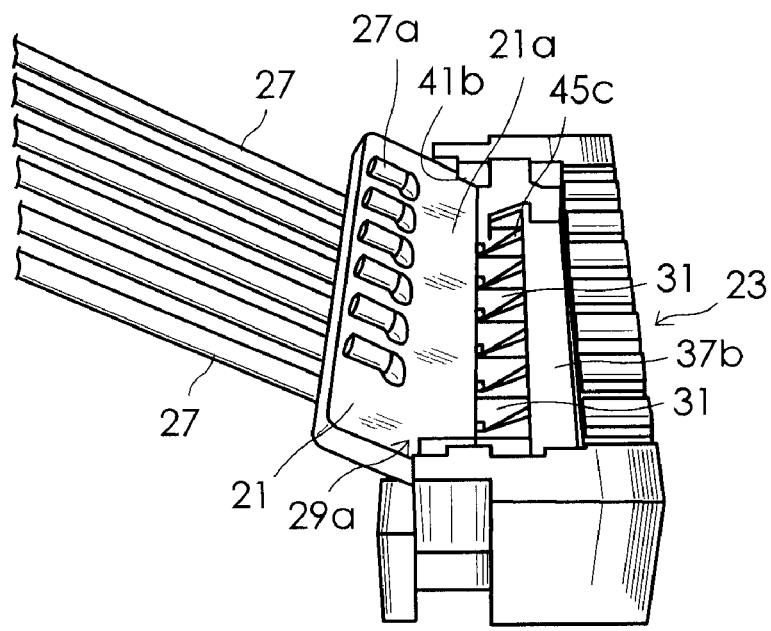
FIGS. 9A and 9B are respectively a diagram for explaining how the lead wire holder is mounted onto the holder mounting portion in the stator for a rotary electric machine shown in FIG. 1.
Figure 9B:
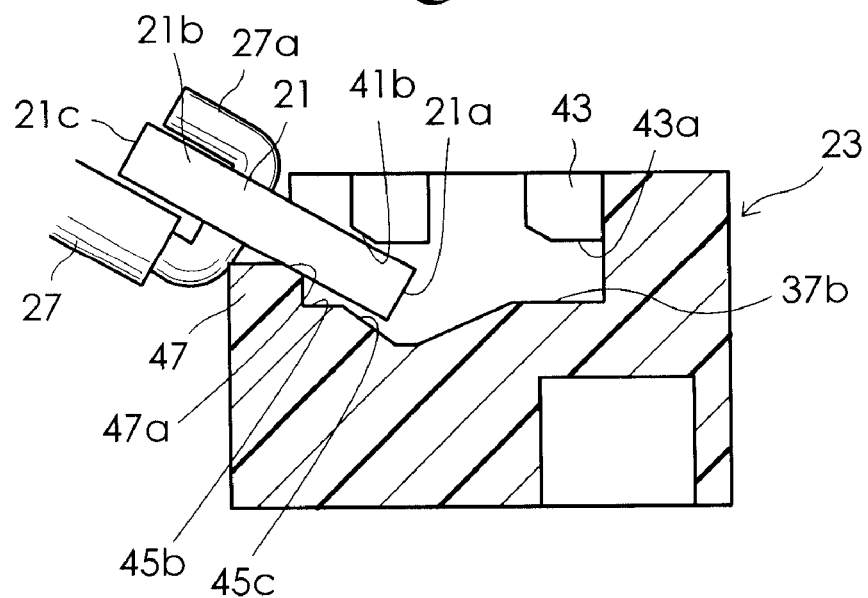
Figure 10A:
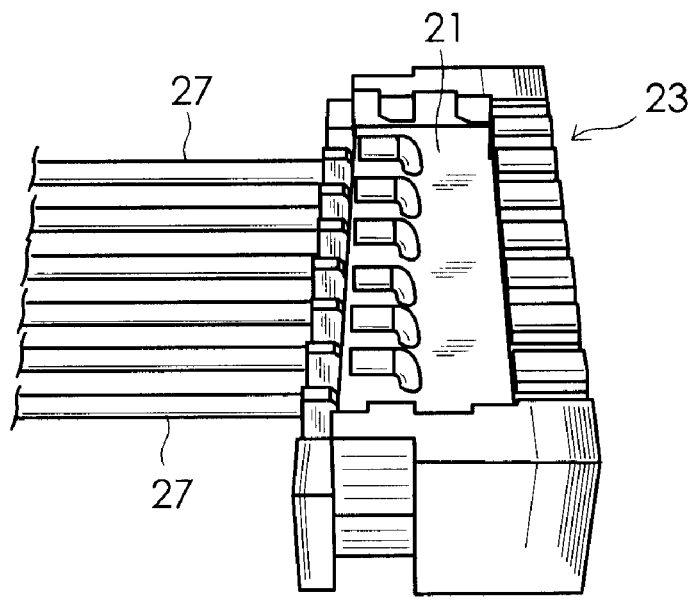
FIGS. 10A and 10B are respectively a diagram for explaining how the lead wire holder is mounted onto the holder mounting portion in the stator for a rotary electric machine shown in FIG. 1.
Figure 10B:
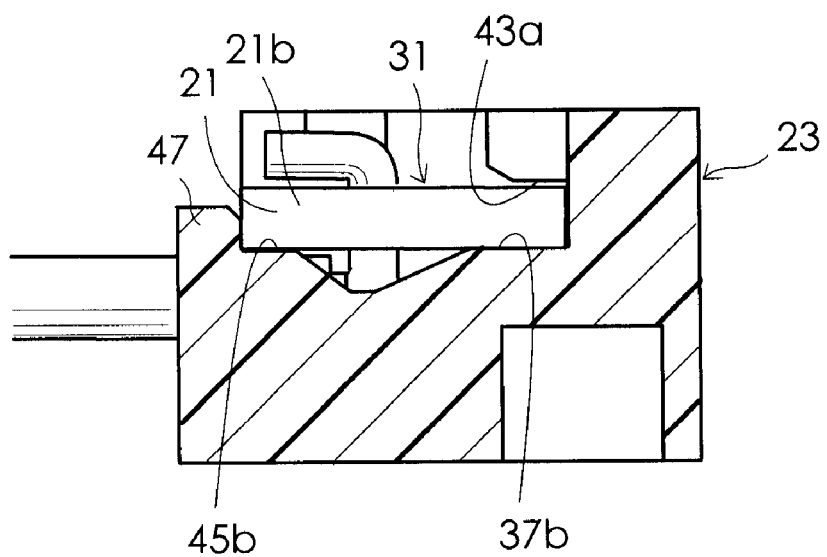

Next, how to mount the lead wire holder 21 onto the holder mounting portion 23 will be described. First, as shown in FIGS. 9A and 9B, a leading end portion 21a of the lead wire holder 21 located in a direction opposite to a direction in which the six lead wires 27 extend is inserted toward the concave surfaces 45c through the insertion opening 29a. The leading end portion 21a of the lead wire holder 21 is guided toward the concave surfaces 45c by the hook portion tapers 41b and the partitioning wall portion tapers 47a. Then, as shown in FIGS. 10A and 10B, after the leading end portion 21a has been entered toward the concave surfaces 45c and then has been gotten out of the concave surfaces 45c, the leading end portion 21a is situated between the opposed surface 43a of the hook 43 and the second supporting surface constituent portion or holder receiving portion bottom surface 37b. With this arrangement, the back surface of a rear end portion 21b located on a side opposite to the leading end portion 21a of the lead wire holder 21 comes into contact with the first supporting surface constituent portion 45b or the end surface portion 45b of each of the five partitioning wall portions 39 and the two sidewall portions 40. Then, an end surface 21c of the rear end portion 21b faces the projecting portions 47, and then the six lead wires 27 are partially received in the six lead wire receiving portions 31, respectively. Then, as described before, the cover member 49 is mounted over the holder mounting portion 23 so that the cover member 49 covers the lead wire holding structure 7.

In the stator for a rotary electric machine in this embodiment, unlike a conventional stator, the opening of the holder receiving portion 29 is not enlarged by bending the hooks 41 and 43 by the lead wire holder 21 in order to mount the lead wire holder 21 onto the holder mounting portion 23. For this reason, the hooks 41 and 43 that prevent the lead wire holder 21 from falling off from the holder mounting portion 23 will not be broken, and the lead wire holder 21 may be thereby prevented positively from falling off from the holder mounting portion 23.

In this embodiment, the cover member is formed separately from the end brackets. The cover member, however, may also be formed as a portion of the end bracket.

In the stator for a rotary electric machine in this embodiment, one of the two sidewall portions 40 is disposed at one end and the other sidewall portion 40 is disposed on the other end in the direction in which the six lead wire receiving portions 31 are arranged. The sidewall portions 40 as described above may be formed, or may not be formed. Further, at both sides of the sidewall portions 40, additional wall portions of the same shape as the sidewall portions 40 may be disposed.

While the preferred embodiment of the invention has been described with a certain degree of particularity with reference to the drawings, obvious modifications and variations are possible in light of the above teachings. It is therefore to be understood that within the scope of the appended claims, the invention may be practiced other than as specifically described.

What is claimed is:

1. A stator for a rotary electric machine comprising:
a stator core including a plurality of magnetic pole portions;
windings of one or more phases wound on the magnetic pole portions of the stator core;
a slot insulator made of an insulating resin, attached to the stator core to provide electric insulation between the stator core and the windings of one or more phases; and
a lead wire holding structure that holds N (N being an integer of two or more) lead wires for external connections, to which a plurality of lead-out wires of the windings of one or more phases are connected, the lead wire holding structure being fixed to the slot insulator,
the lead wire holding structure including:
  a plate-like lead wire holder that holds the N lead wires in such a manner that one end of each of core wires of the N lead wires is exposed and the core wires are arranged at predetermined intervals, the plate-like lead wire holder having a front surface and a back surface; and
  a holder mounting portion to which the lead wire holder is mounted, whereby the lead wire holder is held with respect to the slot insulator,
the lead wire holder having N through holes into which the core wires of the N lead wires are respectively inserted, the N through holes being open in both of the front and back surfaces and disposed at the predetermined intervals in a direction where the N lead wires are arranged,
the core wires of the N lead wires being inserted into the N through holes in the lead wire holder from the back surface of the lead wire holder to protrude out of the front surface, and the N lead wires extending along the back surface in the same direction,
the holder mounting portion including:
  a supporting surface including a first supporting surface constituent portion and a second supporting surface constituent portion, which partially supports the back surface of the lead wire holder;
  opposed surfaces that partially face a peripheral edge portion of the front surface of the lead wire holder;
  N lead wire receiving portions that respectively receive portions of the N lead wires arranged at intervals along the back surface of the lead wire holder, and that are disposed lower than a hypothetical plane containing the supporting surface as a lower direction is defined in which the supporting surface is located lower than the opposed surfaces and an upper direction is defined in which the opposed surfaces are located higher than the supporting surface;
  N−1 partitioning wall portions each disposed between adjacent two of the lead wire receiving portions, extending in the upper direction to partition the adjacent two of the lead wire receiving portions,
the N lead wire receiving portions each having a lead wire exit that opens toward one side of an orthogonal direction orthogonal to both of the lower direction and a direction where the N−1 partitioning wall portions are arranged and allows the lead wires to extend outwardly from the lead wire receiving portions,
the N−1 partitioning wall portions each including a partitioning wall main portion and a projecting portion, the partitioning wall main portion having an end surface in the upper direction, part of the end surface partially constituting the first supporting surface constituent portion, the projecting portion extending in the upper direction from an end of the partitioning wall main portion located side by side with the lead wire exit, wherein
the part of the end surface of each of the N−1 partitioning wall portions, which constitutes the first supporting surface constituent portion, is located adjacent to the projecting portion,
a concave surface is formed on the end surface of each of the N−1 partitioning wall portions so as to be continuous with the first supporting surface constituent portion and so as to take on a convex shape toward the lower direction,
the second supporting surface constituent portion is continuous with the concave surface and extends away from the lead wire exit in the orthogonal direction,
an insertion opening is formed in the vicinity of the projecting portions, whereby a leading end portion of the lead wire holder, located in a direction opposite to the direction where the N lead wires extend, is inserted toward the concave surfaces through the insertion opening,
the lead wire holding structure is configured so that the leading end portion is inserted toward the concave surfaces through the insertion opening, and then gets out of the concave surface to situate the lead wire holder between the opposed surfaces and the supporting surface whereby the N lead wires are partially received in the N lead wire receiving portions, respectively,
a part of the opposed surfaces are disposed to face the second supporting surface constituent portion, and remainders of the opposed surfaces are disposed on a side of the first supporting surface constituent portion rather than on a side of the second supporting surface constituent portion, not facing the first supporting surface constituent portion,
a shape of the concave surface, a shape of the projecting portion, positions of the part of the opposed surfaces that face the second supporting surface constituent portion, positions of the remainders of the opposed surfaces that do not face the first supporting surface constituent portion, and a shape of each of the lead wire receiving portions are defined so that after the leading end portion of the lead wire holder has been inserted toward the concave surfaces through the insertion opening, the lead wire holder is situated between the part of the opposed surfaces that face the second supporting surface constituent portion and the second supporting surface constituent portion, a back surface of a rear end portion located on a side opposite to the leading end portion of the lead wire holder is brought into contact with the first supporting surface constituent portion, an end surface of the rear end portion faces the projecting portions, and the N lead wires are partially received in the lead wire receiving portions, respectively, the holder mounting portion includes a pair of opposed wall portions respectively disposed at either end thereof in a direction where the N lead wire receiving portions and the N−1 partitioning wall portions are alternately arranged, the pair of opposed wall portions extending in the upper direction with respect to the opposed surfaces, the pair of opposed wall portions each includes a pair of hooks integrally provided at each of the opposed wall portions, the pair of hooks projecting in a mutually facing direction, and the pair of hooks are spaced from each other in the orthogonal direction, and surfaces of the pair of hooks, which face the supporting surface, constitute the opposed surfaces.

2. The stator for a rotary electric machine according to claim 1, wherein a hook portion taper is formed at a lower outside corner portion of one of the pair of hooks, the one hook being located on a side of the lead wire exit in the orthogonal direction, a partitioning wall portion taper is formed at an upper inside corner portion of the projecting portion of each of the N−1 partitioning wall portions and the insertion opening is defined by a gap between the hook portion taper and the partitioning wall portion taper.

3. The stator for a rotary electric machine according to claim 1, wherein the lead wire holding structure is covered with a cover member which is engaged with the holder mounting portion to prevent the lead wire holder from falling off from the holder mounting portion.

4. The stator for a rotary electric machine according to claim 1, wherein the lead wire holder is composed of a circuit substrate with a circuit pattern formed thereon; and conductive wires extending from the windings are respectively soldered at predetermined positions of the circuit pattern on the front surface of the lead wire holder.

* * * * *